US008041033B2

(12) United States Patent
Schneider

(10) Patent No.: US 8,041,033 B2
(45) Date of Patent: Oct. 18, 2011

(54) CIPHER FEEDBACK WITH VARIABLE BLOCK CHAINING

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 812 days.

(21) Appl. No.: 12/100,605

(22) Filed: Apr. 10, 2008

(65) Prior Publication Data

US 2009/0257583 A1 Oct. 15, 2009

(51) Int. Cl.
 H04K 1/04 (2006.01)
 H04K 1/06 (2006.01)
(52) U.S. Cl. ................. 380/37; 380/28; 380/29
(58) Field of Classification Search .............. 380/28–30, 380/37
See application file for complete search history.

(56) References Cited

U.S. PATENT DOCUMENTS
2006/0088156 A1* 4/2006 Belenky et al. ................. 380/28
* cited by examiner Primary Examiner — Christian Laforgia
(74) Attorney, Agent, or Firm — Lowenstein Sandler PC

(57) ABSTRACT

Some embodiments of a method and apparatus for encrypting and decrypting data have been presented. In one embodiment, a current initialization vector (IV) is generated based on a previous block of plaintext enciphered. Then a current block of plaintext is combined with the current IV to create a temporary block. An encipher may encipher the temporary block to generate a current block of ciphertext.

15 Claims, 5 Drawing Sheets

CIPHER FEEDBACK WITH VARIABLE BLOCK CHAINING

TECHNICAL FIELD

Embodiments of the present invention relate to data encryption, and more specifically to data encryption that combines block ciphers and ciphertext feedback.

BACKGROUND

Encryption is a process of transforming information (referred to as plaintext) into an unreadable form (referred to as ciphertext). Decryption is a transformation that recovers the plaintext from the ciphertext. A cipher performs a transformation that is controlled using a symmetric key (same key used for ciphering and deciphering) or an asymmetric key (different keys used for ciphering and deciphering) such that when the key is input to the cipher along with plaintext, the plaintext is enciphered via an encryption transformation, and when the key is input to the cipher along with ciphertext, the ciphertext is deciphered via a decryption transformation (which is an inverse of the encryption transformation). Encryption transformations are performed by an encryption algorithm (function) of a cipher, and decryption transformations are performed by a decryption algorithm (function) of the cipher. As such, the term "encipher" and "encrypt" may be used interchangeably in the following discussion. Likewise, the term "decipher" and "decrypt" may also be used interchangeably in the following discussion.

Encryption is used to protect military and civilian systems, examples of which include Internet e-commerce, mobile telephone networks, bank automatic teller machines, etc. As technology and computing power advance, new vulnerabilities are commonly discovered for encryption mechanisms that were previously considered secure. When such weaknesses are discovered, new encryption mechanisms and techniques are required to maintain security of sensitive information.

Conventionally, cyphertext block chaining provides an encryption mode to prevent an attacker from being able to create a code table from commonly repeated blocks. For instance, a block of all space characters always results in the same ciphertext block. Specifically, an output stream is prepended with a random block, which is referred to as an initialization vector (IV). For each block to be enciphered, the IV is combined with the current block of plaintext using a binary exclusive or (XOR) operation. Then the resulting block is enciphered. The current IV is replaced with the resulting enciphered block, which is appended to the output stream.

The above conventional approach is reasonably fast and strong. However, such approach does not completely eliminate all output patterns. In particular, if the same output block is produced more than once for the same key, it may be possible to determine some statistical information about the plaintext of the blocks that follow. The above possibility exists even if the block occurs in a different output stream. Therefore, data security may be compromised.

BRIEF DESCRIPTION OF THE DRAWINGS

The present invention is illustrated by way of example, and not by way of limitation, in the figures of the accompanying drawings and in which.

DETAILED DESCRIPTION

Figure 1:
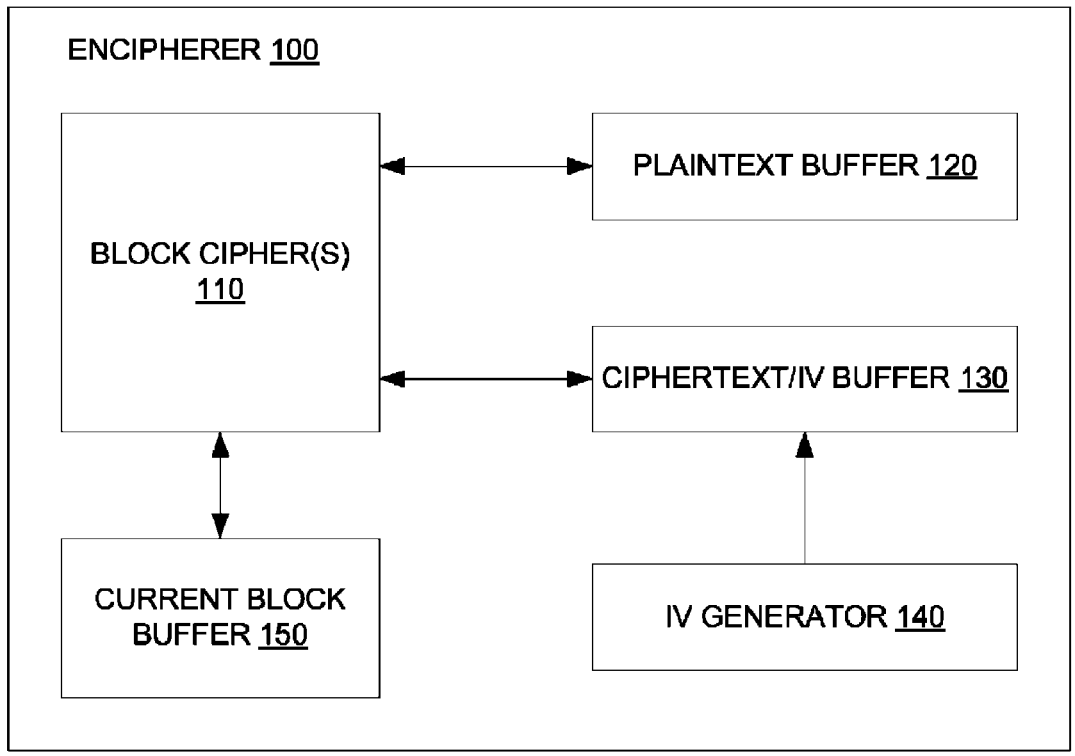
FIG. 1 illustrates an encipherer, in accordance with one embodiment of the present invention.

Described herein are embodiments of a method and apparatus for encrypting and decrypting data. In one embodiment, a number of blocks of random data are generated, where each block is the same size as the block used by a block cipher. The last of these blocks of random data is combined with a first block of plaintext data, and the resulting block of data is enciphered to generate a ciphertext output. The individual bytes of the resulting block are also combined into a single byte value. This single byte value is used as an index into the blocks of random data that have been initially generated, and the first block of ciphertext output. The indexed block is then combined with a second plaintext block, and the result is then enciphered, and its bytes combined, as for the first plaintext block. This process may be repeated iteratively until all blocks of plaintext have been enciphered.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates an encipherer 100, in accordance with one embodiment of the present invention. The encipherer 100 enciphers (or encrypts) and deciphers (or decrypts) data. In one embodiment, the encipherer 100 includes one or more block ciphers 110, which are coupled to one or more input buffers and one or more output buffers. When encrypting, the input buffer is identified with plaintext buffer 120, and the output buffer is identified with ciphertext/IV buffer 130. The ciphertext/IV buffer may be coupled with an IV (initialization vector) generator 140. When decrypting, the input buffer is identified with ciphertext/IV buffer 130, and the output buffer is identified with plaintext buffer 120. The encipherer 100 may also include a current block buffer 150 coupled to the block ciphers 110.

Block ciphers 110 are substitution ciphers that operate on fixed-length groups of bits known as blocks. Where data to be encrypted is longer than a block, the data may be divided into multiple blocks, and each block is separately encrypted. In one embodiment, block ciphers may execute an encryption and a decryption algorithm, each of which accepts an input block of size n bits as a first input and a key of size k bits as a second input, and produce an n-bit output block. For example, a block cipher might take as an input a 128-bit block of plaintext (which is unciphered data) and an 80. bit key, and output a corresponding 128-bit block of ciphertext (which is ciphered data). Likewise, the block cipher may take as an input a 128-bit block of ciphertext and the 80. bit key, and output a 128-bit block of plaintext. In another embodiment, the encryption algorithm may accept an input block of size m bits, and output a block of size n bits, and the decryption algorithm may accept an input block of size n bits, and output a block of size m bits. Some exemplary block sizes for a block cipher to operate on include 64. bit (i.e., 8 byte) and 128. bit (i.e., 16. byte), and some exemplary common key sizes include 40. bits, 56. bits, 64. bits, 80. bits, 128. bits, 160. bits, 168. bits, 192. bits, and 256. bits. Other sized blocks and keys may also be used. Some examples of block ciphers include twofish, blowfish, serpent, data encryption standard (DES), advanced encryption standard (AES), CAST5, international data encryption algorithm (IDEA), etc.

Plaintext buffer 120 may be a storage device or part of a storage device that contains unencrypted data. The data may be either awaiting encryption, or the result of decryption.

Likewise, ciphertext/IV buffer 130 may be a storage device or part of a storage device that contains encrypted data. The data may be either awaiting decryption, or the result of encryption.

In some embodiments, IV generator 140 generates random or unpredictable sequences of bits that are of the same size as the input block size of the block ciphers 110. The encipherer 100 may direct IV generator 140 to generate one or several of these bit sequences at a time, and store the resulting sequences in ciphertext/IV buffer 130.

Current block buffer 150 may be a storage device or part of a storage device large enough to contain a bit sequence that is the same size as the input block size or the output block size of the block ciphers 110. Block ciphers 110 may retrieved data to be enciphered from current block buffer 150 when encrypting. Alternatively, block ciphers 110 may store the deciphered data into current block buffer 150 when decrypting.

In some embodiments, data is encrypted by encipherer 100 in sequential blocks. Encipherer 100 may start encryption by directing IV generator 140 to provide one or more blocks of data to use as initialization vectors, and storing them into ciphertext/IV buffer 130. The current block buffer may be initialized with a particular value. Each block from plaintext buffer 120 to be encrypted may be combined with one or more blocks from ciphertext/IV buffer 130. The block or blocks from ciphertext/IV buffer that are combined with the block to be encrypted from plaintext buffer 120 may be determined from the current contents of current block buffer 150 (for example, by using each byte of current block buffer 150 as an index into the most recent 256 ciphertext blocks/IVs, or by combining the bytes in current block buffer 150 into a single byte value, and using that as an index). The blocks may be combined by performing a bitwise XOR operation on the blocks to be combined. The result of combining these blocks may be stored in current block buffer 150. The contents of current block buffer 150 may be enciphered using one or more of block ciphers 110, and the resulting ciphertext may be appended to the current contents of ciphertext/IV buffer 130.

In some embodiments, data is decrypted by encipherer 100 in sequential blocks. Encipherer 100 may start decryption by initializing current block buffer 150 identically to how it was initialized while encrypting. Encipherer 100 may then skip a number of preliminary blocks in ciphertext/IV buffer 130 corresponding to the number of blocks that were generated for encryption. For each block to be decrypted, encipherer 100 may decipher the block in ciphertext/IV buffer 130 that is being decrypted. Encipherer 100 may then use the contents of current block buffer 150 to determine which blocks from ciphertext/IV buffer 130 were combined with the original plaintext block. Encipherer 100 may then store the result of deciphering the block in ciphertext/IV buffer 130 into current block buffer 150, and reverse the combining performed on the one or more blocks of ciphertext or IVs and the original plaintext block. Encipherer 100 may then store the recovered plaintext block into plaintext buffer 120.

By combining random initialization vectors (IVs) and previously encrypted blocks into the current plaintext block, the encipherer 100 removes patterns from the plaintext that may extend beyond the size of a single block. By using one or more blocks chosen from a set of blocks in a manner that cannot be determined without access to the plaintext, encipherer 100 removes patterns that may be apparent when the size of the plaintext is very large (for example, larger than a terabyte). By using one or more blocks chosen in a manner that depends on both the plaintext and the key, certain cryptographic attacks against block cipher(s) 110 may be made more difficult.

Figure 2:
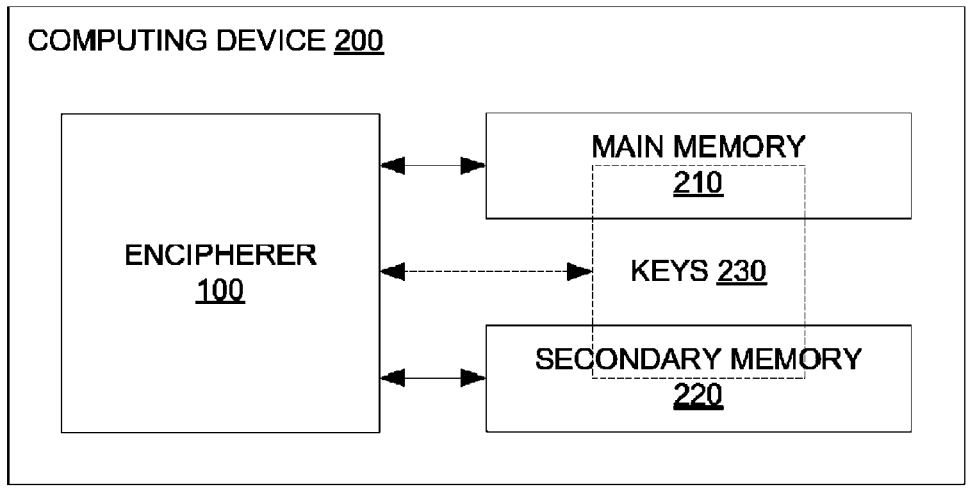
FIG. 2 illustrates an exemplary computing device, in accordance with one embodiment of the present invention.

FIG. 2 illustrates an exemplary computing device 200, in accordance with one embodiment of the present invention. The computing device 200 includes encipherer 100 connected with a main memory 210 and a secondary memory 220. Details of some embodiments of encipherer 100 have been described above. The main memory 210 may include volatile memory (e.g., read-only memory (ROM), flash memory, dynamic random access memory (DRAM) such as synchronous DRAM (SDRAM) or Rambus DRAM (RDRAM), etc.) or static memory (e.g., flash memory, static random access memory (SRAM), etc.). The secondary memory 220 may include one or more persistent data storage devices that may include, for example static memory, hard drives, optical drives, tape backup systems, etc. The secondary memory 220 may be local to the computing device 200 (as illustrated), or external to the computing device 200.

In one embodiment, keys 230 are stored in secondary memory 220. In another embodiment, keys 230 are stored in main memory 210. Keys 230 may be stored, for example, in a protected region of main memory 210 or secondary memory 220 (memory accessible only to certain processes). In yet another embodiment, keys 230 are stored externally to computing device 200. Such externally stored keys 230 may be stored, for example, in a universal serial bus (USB) dongle, firewire dongle, or other external storage device. In embodiments that implement external keys, encrypted regions of the main memory 210 and secondary memory 220 may not be decrypted unless the external storage device having keys 230 is communicatively coupled to computing device 200.

Keys 230 may include one or more block cipher keys for use with block cipher(s) 110 of encipherer 100. In one embodiment, keys 230 also include the initialization value to use in current block buffer 150 of encipherer 100 when encryption or decryption is started. In an alternative embodiment, the initialization value used is fixed. In one embodiment, keys 230 determine which one or more of the block cipher(s) 110 are used by encipherer 100. In an alternative embodiment, this selection is fixed. In one embodiment, keys 230 are encrypted such that a password must be provided to enable access to them. Alternatively, keys 230 may not be encrypted.

In one embodiment, encipherer 100 is a hardware component of computing device 200. Alternatively, encipherer 100 may include software that is part of an operating system, an application, or a combination thereof. Encipherer 100 may also be a combination of two or more of software, firmware, and hardware.

In some embodiments, encipherer 100 can encipher data in the main memory 210 and the secondary memory 220 to secure such data. When enciphering data, new keys may be generated and stored, or existing keys may be provided. In one embodiment, the encipherer 100 is configured to encrypt data in all of secondary memory 210 and main memory 220. In another embodiment, only some of the data in main memory 210 and/or secondary memory 220 is encrypted (e.g., using filesystem-level encryption). In both instances, encrypted data may not be read or used until encipherer 100 deciphers the enciphered data using the same keys 230 used to encrypt the data.

Figure 3:
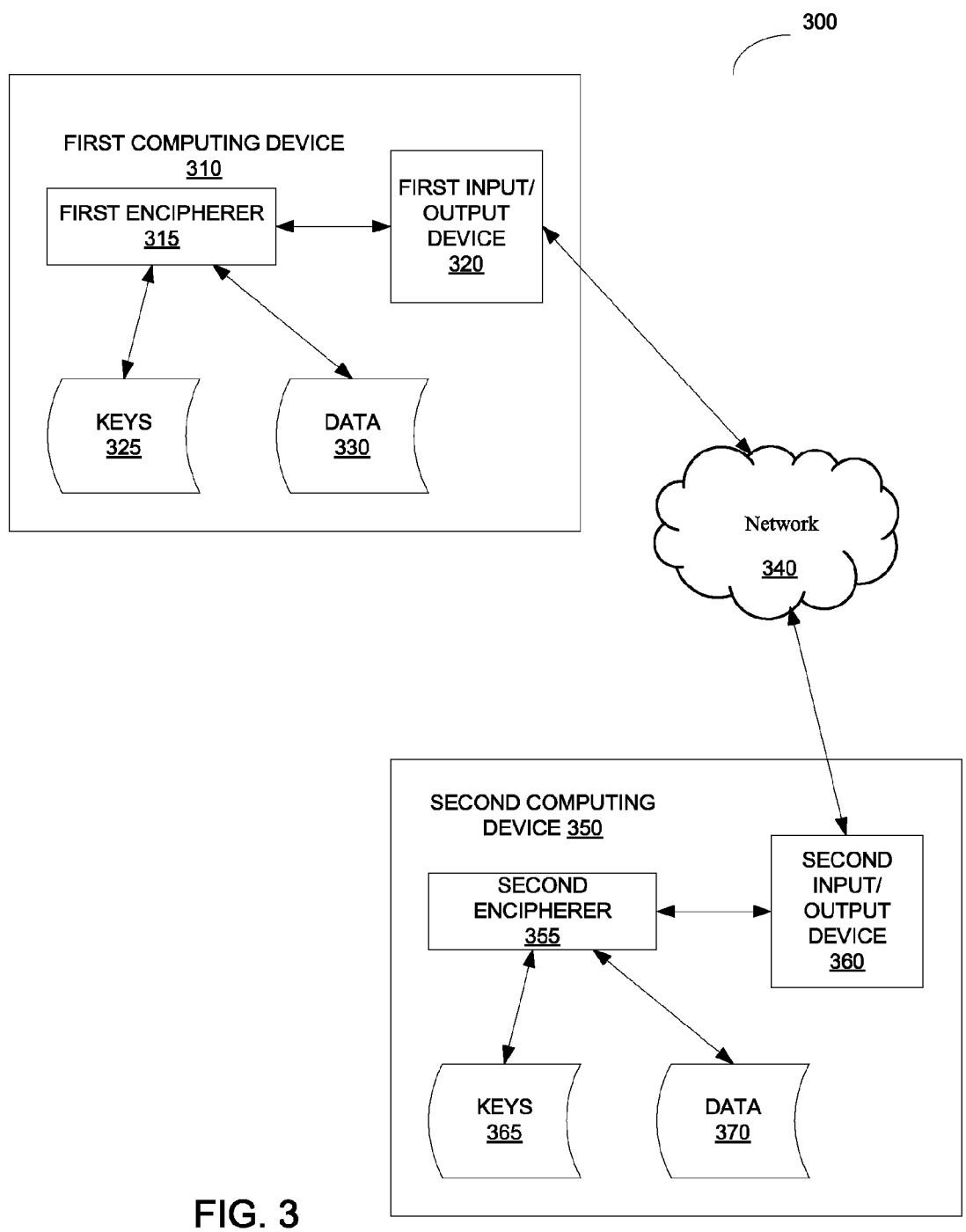
FIG. 3 illustrates an exemplary network architecture, in which embodiments of the present invention may operate.

FIG. 3 illustrates an exemplary network architecture 300, in which embodiments of the present invention may operate. The network architecture 300 may include a first computing device 310 connected to a second computing device 350 via a network 340, which may include a public network (e.g., Internet) and/or a private network (e.g., Ethernet or a local area Network (LAN)).

First computing device 310 and second computing device 350 may be personal computers (PCs), servers, personal data assistants (PDAs), cellular phones, etc. First computing device 310 and/or second computing device 350 may be connected with one or more additional computing devices (not shown), and may provide data encryption services to the additional computing devices. Thereby, it may not be necessary for the additional computing devices to include an encipherer.

Each of the first computing device 310 and the second computing device 350 include an input/output 320 and 360, an encipherer 315 and 355, data 330 and 370, and keys 325 and 365, respectively. In one embodiment, the first encipherer 315 and second encipherer 355 are each examples of encipherer 100 of FIG. 1. First encipherer 315 enciphers data 330 using keys 325, which may be internal or external to first computing device 310. First encipherer 315 forwards the encrypted data 330 to the first input/output 320, which sends the encrypted data over the network 340 to the second input/output 360 of the second computing device 350. Data may be sent between first input/output 320 and second input/output 360 using a network application. Examples of network applications include those that communicate using file transfer protocol (FTP), telnet, email, instant messaging, hyper text transfer protocol (HTTP), etc. The second input/output device 360 passes on the data to the second encipherer 355, which decrypts the data 370 using keys 365. To successfully decrypt data 370, second encipherer 355 must have access to the same keys 325 that have been used to encrypt data 330.

Figure 4:
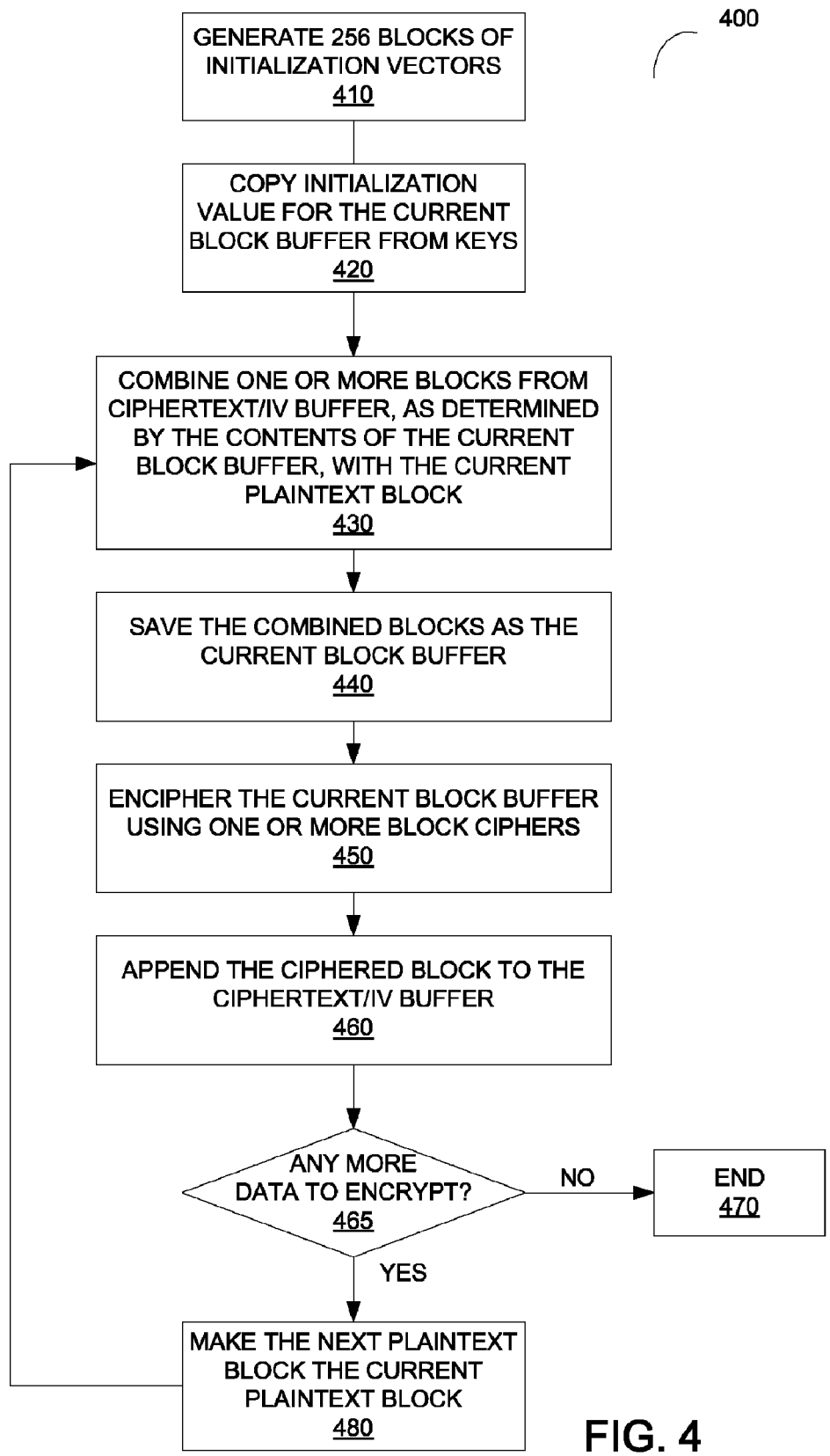
FIG. 4 illustrates a flow diagram of one embodiment for a method of encrypting data.

FIG. 4 illustrates a flow diagram of one embodiment for a method 400 of encrypting data. The method may be performed by processing logic that may comprise hardware (e.g., circuitry, dedicated logic, programmable logic, microcode, etc.), software (such as instructions run on a processing device), or a combination thereof. In one embodiment, method 400 is performed by encipherer 100 of FIG. 1.

Referring to FIG. 4, method 400 begins by generating 256 blocks of initialization vectors (block 410). These blocks may be stored in ciphertext/IV buffer 130 of encipherer 100 of FIG. 1. Alternatively, another number of blocks that is a power of two may be generated, such as 16, 64, 128, 512, etc. At block 420, the initialization value for the current block buffer 150 (FIG. 1) is copied from the keys 230 (FIG. 2). In an alternative embodiment, this initialization value is fixed. At block 430, one or more blocks, as determined by the contents of the current block buffer 150, from the ciphertext/IV buffer 130 are combined with the current plaintext block. At block 440, the combined plaintext and one or more blocks from ciphertext/IV buffer 130 is saved as the current block buffer 150. At block 450, the current block buffer is enciphered using one or more of block cipher(s) 110 of encipherer 100. At block 460, the enciphered block is appended to the ciphertext/IV buffer 130. At block 465, it is checked if there is any more data to encrypt. If there is no more data to encrypt, the method ends at block 470. Otherwise, the next plaintext block becomes the current plaintext block at block 480, and the method loops back to block 430.

Figure 5:
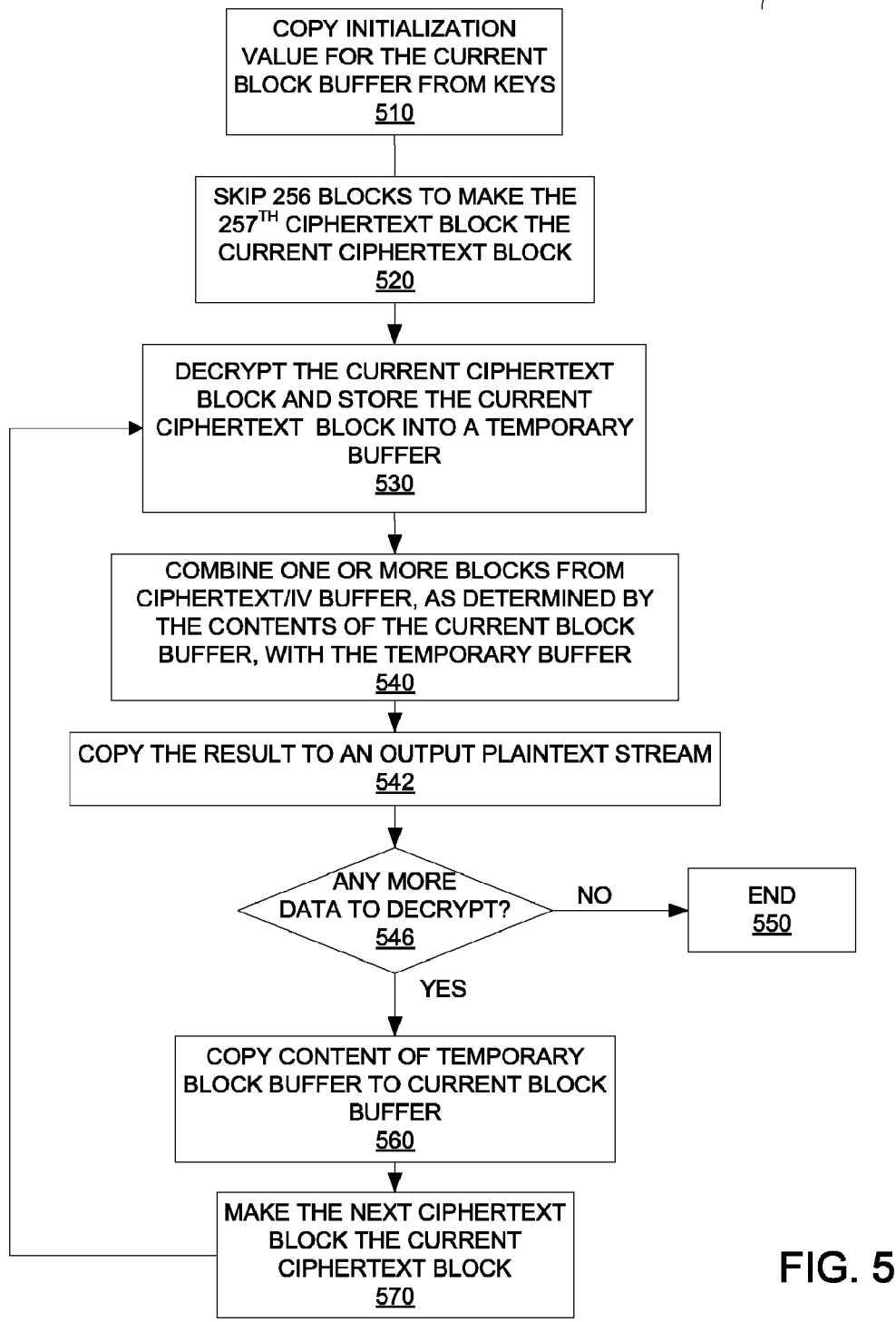
FIG. 5 illustrates a flow diagram of one embodiment for a method of decrypting data.

FIG. 5 illustrates a flow diagram of one embodiment for a method 500 of decrypting data. The method may be performed by processing logic that may comprise hardware (e.g., circuitry, dedicated logic, programmable logic, microcode, etc.), software (such as instructions run on a processing device), or a combination thereof. In one embodiment, method 500 is performed by encipherer 100 of FIG. 1.

Referring to FIG. 5, method 500 begins by copying the initialization value for the current block buffer 150 from the keys 230 (block 510). Alternatively, this initialization value may be fixed. At block 520, 256. blocks (corresponding to initialization vectors) are skipped, making the $257^{th}$. ciphertext block the current ciphertext block. Alternatively, another number of blocks that is a power of two may be skipped, such as 16, 64, 128, 512, etc. At block 530, the current ciphertext block is decrypted and stored into a temporary buffer. At block 540, one or more blocks, as determined by the contents of the current block buffer 150, from the ciphertext/IV buffer 130 are combined with the temporary buffer, with the result being appended to the plaintext buffer 120. At block 542, the result is copied to an output plaintext stream. At block 546, it is determined if there is any more data to decrypt. If there is no more data to decrypt, the method ends at block 550. Otherwise, the contents of the temporary buffer are copied to the current block buffer 150 at block 560. In an alternative embodiment, the current block buffer 150 and the temporary buffer are simply renamed, such that they are each used alternatively. At block 570, the next ciphertext block is made the current ciphertext block, and the method loops to block 530.

Figure 6:
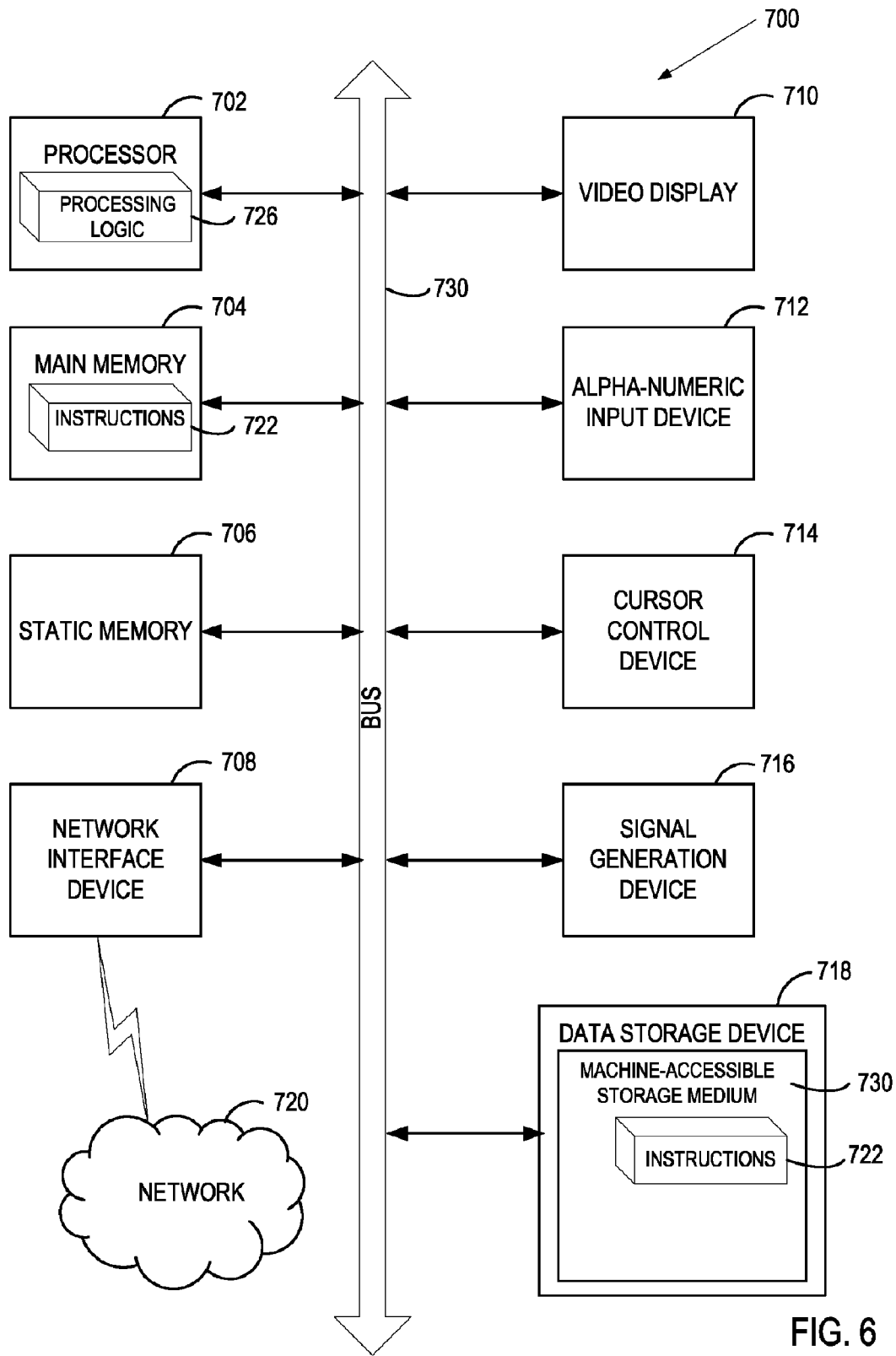
FIG. 6 illustrates a block diagram of an exemplary computer system, in accordance with one embodiment of the present invention.

FIG. 6 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-accessible storage media. The software 722 may further be transmitted or received over a network 720 via the network interface device 708.

The machine-accessible storage medium 730 may also be used to store data structure sets that define user identifying states and user preferences that define user profiles. Data structure sets and user profiles may also be stored in other sections of computer system 700, such as static memory 706.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

I claim:

1. A method, implemented by a computing system programmed to perform the following, comprising:
   generating a predetermined number of blocks of random data;
   prepending the predetermined number of blocks of random data to an output stream;
   combining a last block of the predetermined number of blocks of random data with a first block of plaintext to create a first temporary block;
   enciphering the first temporary block to generate a first block of ciphertext;
   performing an exclusive-OR (XOR) operation on all bits of the first block of plaintext in its pre-enciphered state;
   generating an index using a result of the XOR operation;
   selecting a block from a set of blocks, including the predetermined number of blocks of random data and the first block of ciphered text, using the index;
   combining the selected block with a second block of plaintext to create a second temporary block; and
   enciphering the second temporary block to generate a second block of ciphertext.

2. The method of claim 1, further comprising:
  appending the first block of ciphertext to the output stream: and
  appending the second block of ciphertext to the output stream.

3. The method of claim 1, further comprising:
  performing a second XOR operation on all bits of the second block of plaintext in its pre- enciphered state;
  generating a second index using a result of the second XOR operation;
  selecting another block from the set of blocks including the predetermined number of blocks of random data, the first block of ciphered text, and the second block of ciphered text using the second index;
  combining the other block with a third block of plaintext to create a third temporary block; and
  enciphering the third temporary block to generate a third block of ciphertext.

4. The method of claim 1, further comprising iteratively repeating the following until all blocks of plaintext have been enciphered:
  performing a current XOR operation on all bits of a current block of plaintext in its pre- enciphered state;
  generating a current index using a result of the current XOR operation;
  selecting a current block from a set of blocks including the predetermined number of blocks of random data and any blocks of ciphered text using the current index;
  combining the selected current block with a current block of plaintext to create a current temporary block; and
  enciphering the current temporary block to generate a current block of ciphertext.

5. A method, implemented by a computing system programmed to perform the following, comprising:
  skipping a predetermined number of blocks of random data at a beginning of an incoming stream:
  deciphering a current block of ciphertext in the incoming stream to generate a temporary block;
  generating a current initialization vector (IV) based on a previously deciphered block of ciphertext;
  performing an exclusive-OR (XOR) operation on the temporary block and the current IV;
  generating an index using a result of the XOR operation;
  selecting a block from a set of blocks, including the predetermined number of blocks of random data, using the index; and
  combining the temporary block with the selected block to generate a current block of plaintext corresponding to the current block of ciphertext.

6. An apparatus comprising:
  a processing device configured to execute an encipherer, wherein the encipherer comprises:
    an initialization vector (IV) generator to generate a predetermined number of blocks of random data;
    an input/output device to append the predetermined number of blocks of random data to an output stream; and
    an encipherer to combine combine a last block of predetermined number of blocks of random data with a first block of plaintext to create a first temporary block and to encipher the first temporary block to generate a first block of ciphertext to perform an exclusive-OR (XOR) operation on all bits of the first block of plaintext in its pre-enciphered state, to generate an index using a result of the XOR operation, to select a block from a set of blocks, including the predetermined number of blocks of random data and the first block of ciphered text, using the index, to combine the selected block with a second block of plaintext to create a second temporary block, and to encipher the second temporary block to generate a second block of ciphertext.

7. The apparatus of claim 6, wherein the input/output device is to append the first block of ciphertext and the second block of ciphertext to the output stream.

8. A system comprising the apparatus of claim 6, further comprising:
  a network, wherein the current block of ciphertext is sent via the network to a computing device.

9. An apparatus comprising:
  a processing device configured to execute an encipherer, wherein the encipherer comprises:
    an initialization vector (IV) generator to generate a current IV based on a previously deciphered block of ciphertext; and
    an encipherer to skip a predetermined number of blocks of random data at a beginning of the incoming stream, to decipher a current block of ciphertext in the incoming stream to generate a temporary block, to perform an exclusive-OR (XOR) operation on the temporary block and the current IV, to generate an index using a result of the XOR operation, to select a block from a set of blocks, including the predetermined number of blocks of random data, using the index, and to combine the temporary block with the selected block to generate a current block of plaintext corresponding to the current block of ciphertext.

10. A system comprising the apparatus of claim 9, further comprising:
  a network, wherein the current block of ciphertext is received from a computing device via the network.

11. A non-transitory computer-readable medium that provides instructions that, when executed by a processing device, will cause the processing device to perform operations comprising:
  generating a predetermined number of blocks of random data;
  prepending the predetermined number of blocks of random data to an output stream;
  combining a last block of the predetermined number of blocks of random data with a first block of plaintext to create a first temporary block;
  enciphering the first temporary block to generate a first block of ciphertext;
  performing an exclusive-OR (XOR) operation on all bits of the first block of plaintext in its pre-enciphered state;
  generating an index using a result of the XOR operation;
  selecting a block from a set of blocks, including the predetermined number of blocks of random data and the first block of ciphered text, using the index;
  combining the selected block with a second block of plaintext to create a second temporary block; and
  enciphering the second temporary block to generate a second block of ciphertext.

12. The computer-readable medium of claim 11, wherein the operations further comprise:
  appending the first block of ciphertext to the output stream; and
  appending the second block of ciphertext to the output stream.

13. The computer-readable medium of claim 11, wherein the operations further comprise:
  performing a second XOR operation on all bits of the second block of plaintext in its pre- enciphered state;

generating a second index using a result of the second XOR operation;
selecting another block from the set of blocks including the predetermined number of blocks of random data, the first block of ciphered text, and the second block of ciphered text using the second index;
combining the other block with a third block of plaintext to create a third temporary block; and
enciphering the third temporary block to generate a third block of ciphertext.

14. The computer-readable medium of claim 11, wherein the operations further comprise iteratively repeating the following until all blocks of plaintext have been enciphered:
performing a current XOR operation on all bits of a current block of plaintext in its pre- enciphered state;
generating a current index using a result of the current XOR operation;
selecting a current block from a set of blocks including the predetermined number of blocks of random data and any blocks of ciphered text using the current index;
combining the selected current block with a current block of plaintext to create a current temporary block; and
enciphering the current temporary block to generate a current block of ciphertext.

15. A non-transitory computer-readable medium that provides instructions that, when executed by a processing device, will cause the processing device to perform operations comprising:
skipping a predetermined number of blocks of random data at a beginning of an incoming stream:
deciphering a current block of ciphertext in the incoming stream to generate a temporary block;
generating a current initialization vector (IV) based on a previously deciphered block of ciphertext;
performing an exclusive-OR (XOR) operation on the temporary block and the current IV;
generating an index using a result of the XOR operation;
selecting a block from a set of blocks, including the predetermined number of blocks of random data, using the index; and
combining the temporary block with the selected block to generate a current block of plaintext corresponding to the current block of ciphertext.

* * * * *